(12) United States Patent
Jeong et al.

(10) Patent No.: US 9,160,030 B2
(45) Date of Patent: *Oct. 13, 2015

(54) MANDREL FOR PREPARATION OF JELLY-ROLL TYPE ELECTRODE ASSEMBLY

(71) Applicant: LG CHEM, LTD., Seoul (KR)

(72) Inventors: Jae Cheol Jeong, Incheon (KR); Hak Kyun Kim, Cheongju-si (KR); Dong-Myung Kim, Daejeon (KR); Sunhwan Kim, Suwon-si (KR); Chang Sin Yeo, Cheongwon-gun (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/956,820

(22) Filed: Aug. 1, 2013

(65) Prior Publication Data

US 2013/0316206 A1    Nov. 28, 2013

Related U.S. Application Data

(63) Continuation of application No. PCT/KR2012/001517, filed on Feb. 29, 2012.

(30) Foreign Application Priority Data

Mar. 31, 2011    (KR) .................. 10-2011-0029376

(51) Int. Cl.
*H01M 10/04*    (2006.01)
*H01M 10/052*    (2010.01)
(Continued)

(52) U.S. Cl.
CPC .......... *H01M 10/0431* (2013.01); *H01M 10/02* (2013.01); *H01M 10/052* (2013.01); *H01M 10/0587* (2013.01); *H01M 10/049* (2013.01); *Y02E 60/122* (2013.01)

(58) Field of Classification Search
CPC .......... H01M 10/0431; H01M 10/052; H01M 10/0587
USPC .......................... 429/94; 164/447; 242/437.3
See application file for complete search history.

(56) References Cited

U.S. PATENT DOCUMENTS 5,658,683 A    8/1997    Kageyama et al.
2005/0095505 A1    5/2005    Ohata et al.
(Continued)

FOREIGN PATENT DOCUMENTS

CN    1612402 A    5/2005
CN    1747220 A    3/2006
(Continued)

OTHER PUBLICATIONS

Machine translation of KR 2006111836 A, obtained Sep. 10, 2014.*
(Continued)

*Primary Examiner* — Nicholas P D'Aniello
(74) *Attorney, Agent, or Firm* — Birch, Stewart, Kolasch & Birch, LLP

(57) ABSTRACT

Disclosed herein is a mandrel configured to be used in a winding process for manufacturing a jelly roll type electrode assembly using a long sheet type stack of a cathode/separator/anode structure, wherein the mandrel is oval in a section perpendicular to a rotational central axis of the mandrel, a length ratio of a major axis to a minor axis of the mandrel being 1.5 or more, and a tilt of an outer side of the mandrel is continuously changed from an end of the minor axis of the mandrel to an end of the major axis of the mandrel in the section perpendicular to the rotational central axis of the mandrel.

10 Claims, 4 Drawing Sheets

(51) Int. Cl.
H01M 10/02 (2006.01)
H01M 10/0587 (2010.01)

(56) References Cited

U.S. PATENT DOCUMENTS

| | | |
|---|---|---|
| 2006/0073380 A1 | 4/2006 | Kim et al. |
| 2010/0285341 A1 | 11/2010 | Yun et al. |

FOREIGN PATENT DOCUMENTS

| | | |
|---|---|---|
| CN | 201623195 U | 11/2010 |
| EP | 0 975 041 A2 | 1/2000 |
| JP | 8-171917 A | 7/1996 |
| JP | 8-195204 A | 7/1996 |
| JP | 2001-236996 A | 8/2001 |
| JP | 2003-73036 A | 3/2003 |
| JP | 2004-127860 A | 4/2004 |
| JP | 2004-335380 A | 11/2004 |
| JP | 2005-13567 A | 5/2005 |
| JP | 2006-80072 A | 3/2006 |
| JP | 2009-134931 A | 6/2009 |
| KR | 10-0362753 B1 | 3/2003 |
| KR | 10-2005-0040788 A | 5/2005 |
| KR | 10-2006-0022127 A | 3/2006 |
| KR | 2006111836 A * | 10/2006 |
| KR | 10-2007-0006247 A1 | 1/2007 |

OTHER PUBLICATIONS

International Search Report, issued in PCT/KR2012/001517, dated Sep. 26, 2012.

Chinese Office Action with English Translation mailed in copending Chinese Application No. 201280014648.3 on Apr. 3, 2015.

* cited by examiner

100

MANDREL FOR PREPARATION OF JELLY-ROLL TYPE ELECTRODE ASSEMBLY

This application is a Continuation of a PCT International Application No. PCT/KR2012/001517 filed on Feb. 29, 2012, which claims priority under 35 U.S.C §119(a) to Patent Application No. 10-2011-0029376 filed in the Republic of Korea on Mar. 31, 2011, all of which are hereby expressly incorporated by reference into the present application.

TECHNICAL FIELD

The present invention relates to a mandrel used to manufacture a jelly roll type electrode assembly, and, more particularly, to a mandrel configured to be used in a winding process for manufacturing a jelly roll type electrode assembly using a long sheet type stack of a cathode/separator/anode structure, wherein the mandrel is oval in a section perpendicular to a rotational central axis of the mandrel, a length ratio of a major axis to a minor axis of the mandrel being 1.5 or more, and a tilt of an outer side of the mandrel is continuously changed from an end of the minor axis of the mandrel to an end of the major axis of the mandrel in the section perpendicular to the rotational central axis of the mandrel in such a manner that the mandrel is configured to have an oval structure so as to reduce wound stress applied from the end of the major axis of the mandrel to the sheet type stack during constant speed rotation of the mandrel when the sheet type stack is wound on the mandrel in a state in which an end of the sheet type stack is fitted in a central region of the mandrel.

BACKGROUND ART

As mobile devices have been increasingly developed, and the demand for such mobile devices has increased, the demand for secondary batteries has also sharply increased as an energy source for such mobile devices. Among such secondary batteries is a lithium secondary battery having high energy density and high discharge voltage, into which much research has been carried out and which is now commercially and widely used.

Depending upon the shape of a battery case, a secondary battery may be classified as a cylindrical battery having an electrode assembly mounted in a cylindrical metal container, a prismatic battery having an electrode assembly mounted in a prismatic metal container, or a pouch-shaped battery having an electrode assembly mounted in a pouch-shaped case formed of an aluminum laminate sheet.

Also, the electrode assembly mounted in the battery case is a power generating element, having a cathode/separator/anode stack structure, which can be charged and discharged. The electrode assembly may be classified as a jelly roll type electrode assembly configured to have a structure in which a long sheet type cathode and a long sheet type anode, to which active materials are applied, are wound in a state in which a separator is disposed between the cathode and the anode, a stacked type electrode assembly configured to have a structure in which a plurality of cathodes having a predetermined size and a plurality of anodes having a predetermined size are sequentially stacked in a state in which separators are disposed respectively between the cathodes and the anodes, or a stacked/folded type electrode assembly configured to have a structure in which a predetermined number of cathodes and a predetermined number of anodes are sequentially stacked in a state in which separators are disposed respectively between the cathodes and the anodes to constitute a unit cell, such as a bi-cell or a full cell, and then unit cells are wound using a separation film. The jelly roll type electrode assembly has advantages in that the jelly roll type electrode assembly is easy to manufacture and has high energy density per unit mass.

Meanwhile, a conventional mandrel used to manufacture an electrode assembly is formed in a hexagonal shape 92 or an angled oval shape in vertical section as shown in FIG. 1. Also, the entirety of the conventional mandrel is made of a single metal. The conventional mandrel has the following problems.

First, a Y-axis velocity change is greater than an X-axis velocity change, i.e. change of linear velocity at which a sheet type stack, such as an electrode, is wound on a mandrel 90 during rotation of the mandrel 90.

Also, force is concentrated upon a folded portion of the sheet type stack contacting an end 96 of a major axis of the mandrel 90, which has the maximum radius of gyration during rotation of the mandrel 90, with the result that acceleration when the sheet type stack comes into contact with the mandrel is increased at the folded portion of the sheet type stack, whereby the amount of impact applied to the folded portion of the sheet type stack is increased.

Furthermore, the linear velocity change at the folded portion of the sheet type stack and the amount of impact applied to the folded portion of the sheet type stack increase residual stress of the sheet type stack. When stress generated at a subsequent process, i.e. a process of compressing the jelly roll electrode assembly, is further applied to the folded portion of the sheet type stack, therefore, the folded portion of the sheet type stack is broken, whereby safety of a battery is lowered.

Consequently, the necessity of a technology for fundamentally solving the above-mentioned problem is very high.

DISCLOSURE

Technical Problem

Therefore, the present invention has been made to solve the above problems and other technical problems that have yet to be resolved.

As a result of a variety of extensive and intensive studies and experiments to solve the problems as described above, the inventors of the present application have developed a mandrel configured so that the mandrel is oval in a section perpendicular to a rotational central axis of the mandrel, a length ratio of a major axis to a minor axis of the mandrel is a predetermined value or more, and the mandrel is configured to have a gentle oval structure in which a tilt of an outer side of the mandrel is continuously changed from an end of the minor axis of the mandrel to an end of the major axis of the mandrel in the section perpendicular to the rotational central axis of the mandrel. In addition, the present inventors have discovered that wound stress applied from the end of the major axis of the mandrel to the sheet type stack during constant speed rotation of the mandrel is greatly reduced when the sheet type stack is wound on the mandrel in a state in which an end of the sheet type stack is fitted in a central region of the mandrel. The present invention has been completed based on these findings.

Technical Solution

In accordance with one aspect of the present invention, the above and other objects can be accomplished by the provision of a mandrel configured to be used in a winding process for manufacturing a jelly roll type electrode assembly using a long sheet type stack of a cathode/separator/anode structure, wherein the mandrel is oval in a section perpendicular to a rotational central axis of the mandrel, a length ratio of a major axis to a minor axis of the mandrel being 1.5 or more, and a tilt of an outer side of the mandrel is continuously changed from an end of the minor axis of the mandrel to an end of the major axis of the mandrel in the section perpendicular to the rotational central axis of the mandrel in such a manner that the mandrel is configured to have an oval structure so as to reduce wound stress applied from the end of the major axis of the mandrel to the sheet type stack during constant speed rotation of the mandrel when the sheet type stack is wound on the mandrel in a state in which an end of the sheet type stack is fitted in a central region of the mandrel.

The mandrel according to the present invention is formed in an oval shape having a gentle curve in a section perpendicular to a rotational central axis of the mandrel. Consequently, the section of the mandrel is decided through a curve drawn by an oval equation about the rotational central axis of the mandrel, and therefore, linear velocity change is minimized when the sheet type stack is wound on the mandrel, thereby reducing the generation of stress of the sheet type stack.

In a concrete example, the conventional mandrel 90 is formed in a hexagonal shape 92 in a section perpendicular to a rotational central axis 94 of the mandrel 90 as shown in FIG. 1. For this reason, rectilinear movement caused when the sheet type stack is wound on the mandrel is controlled by rotary movement of the mandrel having no fixed radius, and the stress of the sheet type stack is not uniform due to difference of force by reduced acceleration generated at that time.

For example, the amount of correction theoretically calculated with respect to the size to compensate for the change of X-axis velocity Vx of the sheet type stack seems to be represented by a function having a cycle of 180 degrees. Actually, however, a point, at which differential is not possible, having a different tilt angle exists at the point of 180 degrees. The displacement is differentiated to obtain the velocity, and therefore, a point, at which the velocity is instantaneously changed, is generated, which means that acceleration is abruptly changed with the result that impact amount is increased.

This is thought to be a phenomenon generated as the mandrel is rotated not in an oval section but in a hexagonal section. That is, the X-axis velocity Vx of the sheet type stack generated when the sheet type stack is wound on the mandrel seems to be theoretically proportional to $\sin \theta$. Actually, however, the maximum value does not appear when $\theta=90$ degrees but an angle less than 90 degrees, for example, at an angle $\theta$ of about 80 degrees. This is thought to be because the maximum exists at a point tangential to a circle of rotary motion.

On the other hand, the mandrel according to the present invention is formed in a gentle oval shape in a section perpendicular to the rotational central axis of the mandrel. Consequently, force change even at the end of the major axis of the mandrel, at which change is great, is much less than that in the conventional mandrel. As a result, force applied to the folded portion of the sheet type stack is reduced, and therefore, it is possible to reduce wound stress applied to the sheet type stack and, at the same time, to uniformalize overall wound stress applied to the sheet type stack.

As defined above, the length ratio of the major axis to the minor axis of the mandrel on the basis of the rotational central axis of the mandrel is 1.5 or more. If the length ratio of the major axis to the minor axis of the mandrel is less than 1.5, the above-mentioned phenomenon is insignificant. Consequently, the present invention is applied to a mandrel in which a relative length range of the minor axis and the major axis satisfies the above conditions. Preferably, the length ratio of the major axis to the minor axis of the mandrel is 1.5 to 4.

In a preferred example, the mandrel may be divided into a first mandrel part located at one side of the central region of the mandrel, in which the end of the sheet type stack is fitted, and a second mandrel part located at the other side of the central region of the mandrel. Consequently, it is possible to adjust the distance between the first mandrel part and the second mandrel part, thereby easily adjusting the size of the jelly roll type electrode assembly.

In the above structure, the first mandrel part and the second mandrel part each may include a main body part having a region in which the sheet type stack is fitted in an engaged state and an edge part having an end of the major axis of the mandrel.

In an example of the above structure, the edge part may be formed of a material exhibiting a modulus of elasticity lower than that of the main body part. Consequently, it is possible to reduce impact amount generated by contact between the sheet type stack and the edge part when the sheet type stack is wound on the mandrel, thereby reducing damage to the sheet type stack and residual stress of the sheet type stack. Preferably, the edge part has a modulus of elasticity equivalent to 0.001 to 0.5 times that of the main body part.

That is, the edge part, which is formed of a low modulus of elasticity, exhibits low strength and high elasticity than the main body part, which is formed of a high modulus of elasticity.

For example, the modulus of elasticity of the main body part is preferably 190 to 210 GPa, and the modulus of elasticity of the edge part is preferably 0.4 to 3 GPa. More preferably, the modulus of elasticity of the edge part is preferably 1 to 3 GPa.

In a preferred example, the main body part may be formed of a metallic material, and the edge part may be formed of a plastic material.

The metallic material may representatively include steel use stainless (SUS) and steel kogu dies (SKD); however, the metallic material is not limited thereto.

Various plastic materials may be used. For example, an engineering plastic material, which exhibits high wear resistance and high durability based on self lubrication, may be used. The engineering plastic material may be selected from a group consisting of, for example, polyamide (PA), polyacetal (POM), polycarbonate (PC), modified polyphenylene oxide (MPPO), polybutylene terephthalate (PBT) and polyether ether ketone (PEEK); however, the engineering plastic material is not limited thereto.

In a case in which the main body part and the edge part are integrated, it is possible to reduce the number of processes of manufacturing the mandrel.

As previously described, the mandrel is configured to have a gentle oval structure in which the tilt of the outer side of the mandrel is continuously changed from the end of the minor axis of the mandrel to the end of the major axis of the mandrel in the section perpendicular to the rotational central axis of the mandrel. This may be expressed as a structure in which a region having no tilt change is absent between the end of the minor axis of the mandrel and the end of the major axis of the mandrel. As a result, the mandrel is formed as a longish shape including the major axis and the minor axis in the section perpendicular to the rotational central axis of the mandrel, and the mandrel is configured to have a structure in which the tilt is continuously and gently changed at the outer side of the mandrel.

In an example, the radius of curvature of the end of the major axis of the mandrel may not be less than ⅓ times the length of the minor axis of the mandrel, and the radius of curvature of the end of the minor axis of the mandrel may not be less than 1.5 times the length of the major axis of the mandrel. Preferably, the radius of curvature of the end of the major axis of the mandrel is ⅓ to 1 times the length of the minor axis of the mandrel, and the radius of curvature of the end of the minor axis of the mandrel is 1.5 to 3 times the length of the major axis of the mandrel.

According to circumstances, a side of the first mandrel part and a corresponding side of the second mandrel part, which face each other on the basis of the rotational central axis of the mandrel, may be configured to have a tapered structure in which a side of the mandrel contacting the sheet type stack is not broken when the mandrel is rotated in a state in which the sheet type stack is fitted in the mandrel. The angle of the tapered structure is not particularly restricted. For example, the angle of the tapered structure may be about 10 to 60 degrees.

In accordance with another aspect of the present invention, there is provided a prismatic lithium secondary battery including a jelly roll type electrode assembly manufactured using the mandrel with the above-stated construction.

After a sheet type stack of a cathode/separator/anode structure is wound on the mandrel, the mandrel is removed. The manufactured jelly roll type electrode assembly is compressed and mounted in a prismatic metal container. A lithium electrolyte is injected into the electrode assembly, and the electrode assembly is sealed to manufacture a prismatic lithium secondary battery.

In the prismatic lithium secondary battery according to the present invention, it is possible to reduce wound stress applied to the sheet type stack from the end of the major axis of the mandrel during a winding process to manufacture the jelly roll type electrode assembly. In a case in which the manufactured jelly roll type electrode assembly is compressed and mounted in a prismatic metal container, therefore, it is possible to solve a problem that a portion of the electrode assembly is broken and, at the same time, to maintain excellent performance of the prismatic lithium secondary battery and secure safety of the battery during use of the battery.

Also, it is possible for the electrode assembly obtained by winding the sheet type stack using the mandrel, which is configured to have an oval structure in vertical section, as described above to maintain an appropriate prismatic shape in vertical section as compared with an electrode assembly obtained by winding a sheet type stack using a conventional mandrel, which is configured to have a circular structure in vertical section. Consequently, the present invention is particularly preferable for manufacture of a prismatic secondary battery.

Other components of the battery based on the jelly roll type electrode assembly and a method of manufacturing the same are well known in the art to which the present invention pertains, and therefore, a detailed description thereof will not be given.

Advantageous Effects

As is apparent from the above description, the mandrel according to the present invention is oval in the section perpendicular to the rotational central axis of the mandrel, the length ratio of a major axis to a minor axis of the mandrel is a predetermined value or more, and the mandrel is configured to have the gentle oval structure in which the tilt of the outer side of the mandrel is continuously changed from the end of the minor axis of the mandrel to the end of the major axis of the mandrel in the section perpendicular to the rotational central axis of the mandrel. When the sheet type stack is wound on the mandrel in a state in which the end of the sheet type stack is fitted in the central region of the mandrel, therefore, the wound stress applied from the end of the major axis of the mandrel to the sheet type stack during constant speed rotation of the mandrel is greatly reduced, thereby securing safety of the battery.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 1:
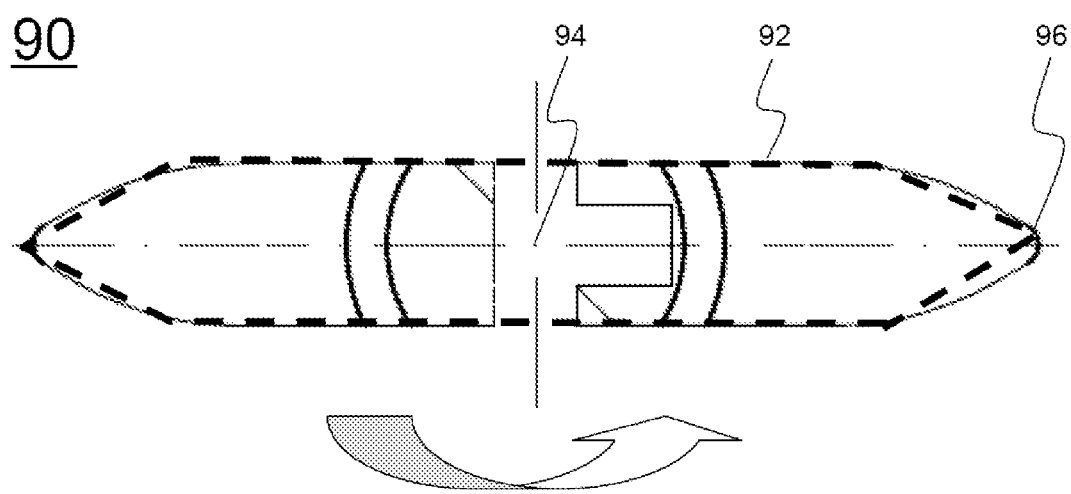
FIG. 1 is a sectional view showing a conventional mandrel.
Figure 2:
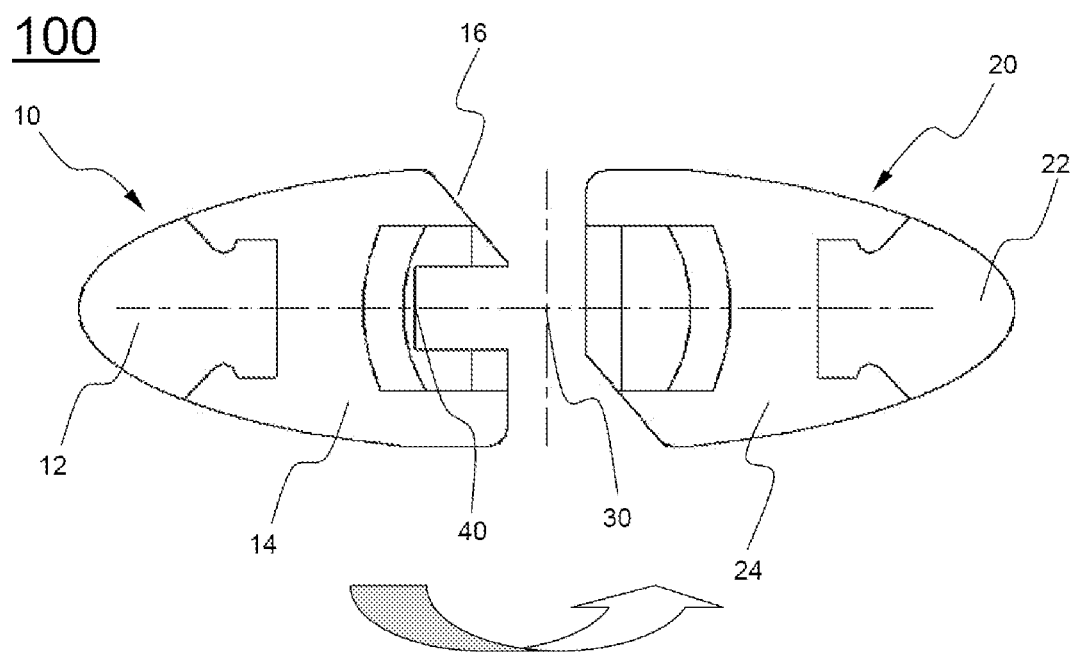
FIGS. 2 and 3 are sectional views showing a mandrel according to an embodiment of the present invention.
Figure 3:
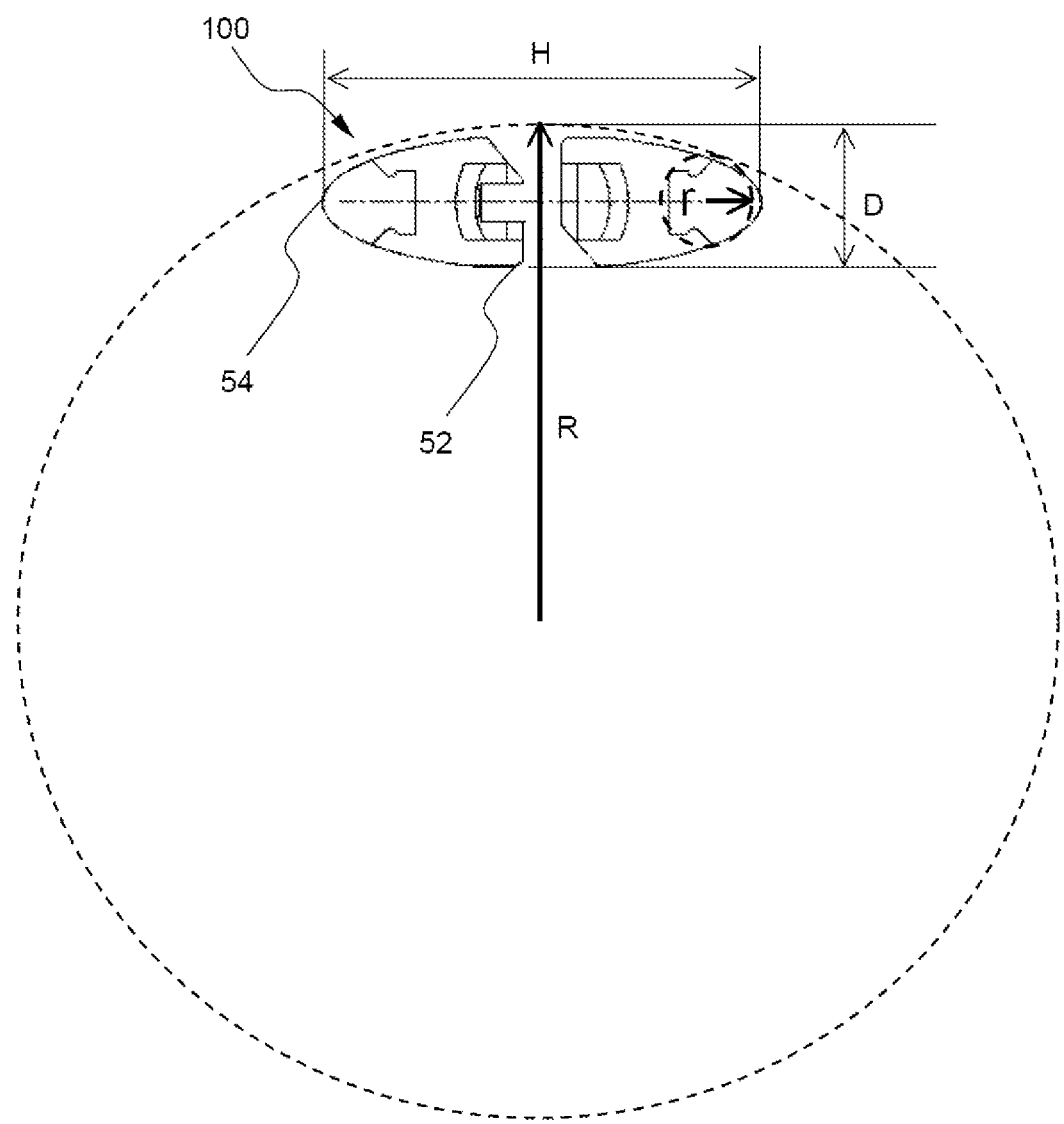
Figure 4:
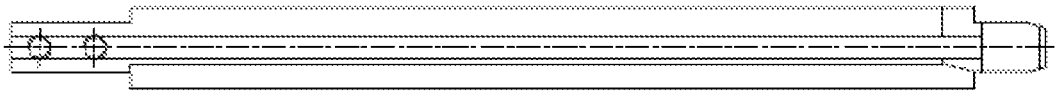
FIG. 4 is a right side view of the mandrel shown in FIG. 2.

FIGS. 2 and 3 are sectional views typically showing a mandrel according to an embodiment of the present invention, and FIG. 4 is a right side view typically showing the mandrel of FIG. 2.

Referring to these drawings, a mandrel 100 is oval in a section perpendicular to a rotational central axis 30 of the mandrel 100, and a length H of the major axis of the mandrel 100 is about twice a length D of the minor axis of the mandrel 100.

Also, the mandrel 100 is configured to have a gentle oval structure in which a tilt of the outer side of the mandrel 100 is continuously changed from an end 52 of the minor axis of the mandrel 100 to an end 54 of the major axis of the mandrel 100 in the section perpendicular to the rotational central axis 30 of the mandrel 100. When a sheet type stack (not shown) is wound on the mandrel 100 in a state in which an end of the sheet type stack is fitted in a depression part 40 located at the central region of the mandrel 100, therefore, wound stress applied from the end 54 of the major axis of the mandrel 100 to the sheet type stack is reduced during constant speed rotation of the mandrel 100.

The depression part 40 is configured to have a structure to hold or release the end of the sheet type stack.

The mandrel 100 is divided into a first mandrel part 10 located at the right side of the central region of the mandrel 100, in which the end of the sheet type stack is fitted, and a second mandrel part 20 located at the left side of the central region of the mandrel 100.

The first mandrel part 10 and the second mandrel part 20 each include a main body part 14 having a region in which the sheet type stack is fitted in an engaged state and an edge part 12 having the end 54 of the major axis of the mandrel 100. According to circumstances, the edge part 12 may be an application layer, having a predetermined thickness, to cover a portion of the main body part 14.

The main body part 14 is formed of a metallic material, and the edge part 12 is formed of a plastic material exhibiting a modulus of elasticity lower than that of the main body part 14.

Also, the main body part 14 and the edge part 12 are generally integrated. In a section perpendicular to the rotational central axis 30 of the mandrel 100, a region having no tilt change is not provided between the end 52 of the minor axis of the mandrel 100 and the end 54 of the major axis of the mandrel 100. That is, a curve is continuously formed from the end 52 of the minor axis of the mandrel 100 to the end 54 of the major axis of the mandrel 100.

A radius of curvature r of the end 54 of the major axis of the mandrel 100 is approximately half the length D of the minor axis of the mandrel 100, and a radius of curvature R of the end 52 of the minor axis of the mandrel 100 is approximately 1.5 times the length H of the major axis of the mandrel 100.

Also, a side of the first mandrel part 10 and a corresponding side of the second mandrel part 20, which face each other on the basis of the rotational central axis 30 of the mandrel 100, are configured to have a tapered structure 16. When the mandrel 100 is rotated in a state in which the sheet type stack is fitted in the mandrel 100, therefore, the side of the mandrel contacting the sheet type stack is not broken.

Meanwhile, the main body part 14 and the edge part 12 are configured to have a male and female fastening structure.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A mandrel configured to be used in a winding process for manufacturing a jelly roll type electrode assembly using a long sheet type stack of a cathode/separator/anode structure, wherein
the mandrel is oval in a section perpendicular to a rotational central axis of the mandrel, a length ratio of a major axis to a minor axis of the mandrel being 1.5 or more,
a tilt of an outer side of the mandrel is continuously changed from an end of the minor axis of the mandrel to an end of the major axis of the mandrel in the section perpendicular to the rotational central axis of the mandrel in such a manner that the mandrel is configured to have an oval structure so as to reduce wound stress applied from the end of the major axis of the mandrel to the sheet type stack during constant speed rotation of the mandrel when the sheet type stack is wound on the mandrel in a state in which an end of the sheet type stack is fitted in a central region of the mandrel,
the mandrel is divided into a first mandrel part located at one side of the central region of the mandrel, in which the end of the sheet type stack is fitted, and a second mandrel part located at the other side of the central region of the mandrel, and
the first mandrel part and the second mandrel part each comprise a main body part having a region in which the sheet type stack is fitted in an engaged state and an edge part having an end of the major axis of the mandrel, and
the edge part is formed of a material exhibiting a modulus of elasticity lower than that of the main body part.

2. The mandrel according to claim 1, wherein the length ratio of the major axis to the minor axis of the mandrel is 1.5 to 4.

3. The mandrel according to claim 1, wherein the main body part is formed of a metallic material, and the edge part is formed of a plastic material.

4. The mandrel according to claim 3, wherein the edge part is formed of an engineering plastic material.

5. The mandrel according to claim 4, wherein the engineering plastic material is selected from a group consisting of polyamide (PA), polyacetal (POM), polycarbonate (PC), modified polyphenylene oxide (MPPO), polybutylene terephthalate (PBT) and polyether ether ketone (PEEK).

6. The mandrel according to claim 1, wherein the main body part and the edge part are integrated.

7. The mandrel according to claim 1, wherein a region having no tilt change is not provided between the end of the minor axis of the mandrel and the end of the major axis of the mandrel in the section perpendicular to the rotational central axis of the mandrel.

8. The mandrel according to claim 1, wherein a radius of curvature of the end of the major axis of the mandrel is not less than ⅓ times a length of the minor axis of the mandrel, and a radius of curvature of the end of the minor axis of the mandrel is not less than 1.5 time a length of the major axis of the mandrel.

9. The mandrel according to claim 1, wherein a side of the first mandrel part and a corresponding side of the second mandrel part, which face each other on the basis of the rotational central axis of the mandrel, are configured to have a tapered structure in which a side of the mandrel contacting the sheet type stack is not broken when the mandrel is rotated in a state in which the sheet type stack is fitted in the mandrel.

10. A prismatic lithium secondary battery comprising a jelly roll type electrode assembly manufactured using a mandrel according to claim 1.

* * * * *